US012645937B2

(12) United States Patent
Ding et al.

(10) Patent No.: US 12,645,937 B2
(45) Date of Patent: Jun. 2, 2026

(54) SYSTEM, METHOD, AND COMPUTER PROGRAM FOR ITERATIVE CONTENT ADAPTIVE ONLINE TRAINING IN NEURAL IMAGE COMPRESSION

(71) Applicant: Tencent America LLC, Palo Alto, CA (US)

(72) Inventors: Ding Ding, Palo Alto, CA (US); Wei Wang, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 413 days.

(21) Appl. No.: 17/952,865

(22) Filed: Sep. 26, 2022

(65) Prior Publication Data

US 2023/0186081 A1    Jun. 15, 2023

Related U.S. Application Data

(60) Provisional application No. 63/289,055, filed on Dec. 13, 2021.

(51) Int. Cl.
G06N 3/08 (2023.01)
G06N 3/04 (2023.01)
(Continued)

(52) U.S. Cl.
CPC ............... G06N 3/08 (2013.01); G06N 3/045 (2023.01); G06T 9/002 (2013.01)

(58) Field of Classification Search
CPC .......... G06N 3/08; G06N 3/045; G06N 3/084; G06N 3/0464; G06T 9/002; G06T 2207/20084
See application file for complete search history.

(56) References Cited

U.S. PATENT DOCUMENTS 11,057,634 B2 *  7/2021  Schroers .............. H04N 19/513
2020/0366914 A1 * 11/2020  Schroers .................. G06N 3/09
(Continued)

FOREIGN PATENT DOCUMENTS

EP          3822916 A1     5/2021
WO    WO-2020008104 A1 *  1/2020  ............. G06T 9/002
WO    WO-2020165493 A1 *  8/2020  ............. G06N 3/045

OTHER PUBLICATIONS

International Search Report issued Feb. 1, 2023 in Application No. PCT/US22/47241.

(Continued)

*Primary Examiner* — Oneal R Mistry
*Assistant Examiner* — Jongbong Nah
(74) *Attorney, Agent, or Firm* — Sughrue Mion, PLLC

(57) ABSTRACT

Iterative content-adaptive online training for end-to-end (E2E) neural image compression (NIC) using a neural network performed by at least one processor, is provided, including receiving an input image, to an E2E NIC framework, fine-tuning the E2E NIC framework, based on the input image, computing parameter updates using a first neural network of the fine-tuned E2E NIC framework, enhancing the fine-tuned E2E NIC framework based on a second neural network, the second neural network being a post-enhancement network, and generating an updated E2E NIC framework, based on the enhanced E2E NIC framework and the parameter updates.

19 Claims, 8 Drawing Sheets

(51) Int. Cl.
    *G06N 3/045*     (2023.01)
    *G06T 9/00*     (2006.01)

(56)              References Cited

U.S. PATENT DOCUMENTS

2021/0142524 A1 *  5/2021  Djelouah ............... H04N 19/90
2021/0360259 A1 * 11/2021  Wang ....................... G06N 3/09
2023/0110503 A1 *  4/2023  Lainema ................ H04N 19/46
                                             375/240.24

OTHER PUBLICATIONS

Written Opinion issued Feb. 1, 2023 in Application No. PCT/US22/47241.
Communication issued Nov. 26, 2024 in Japanese Application No. 2023-558148.
Communication issued Oct. 21, 2024 in Korean Application No. 10-2023-7030764.
Maria Santamaria, et al. "Content—adaptive convolutional neural network post—Processing filter", IEEE International Symposium on Multimedia, Nov. 29, 2021, pp. 99-106 (8 pages).
Extended European Search Report Feb. 11, 2025 in Application No. 22908181.5.

\* cited by examiner

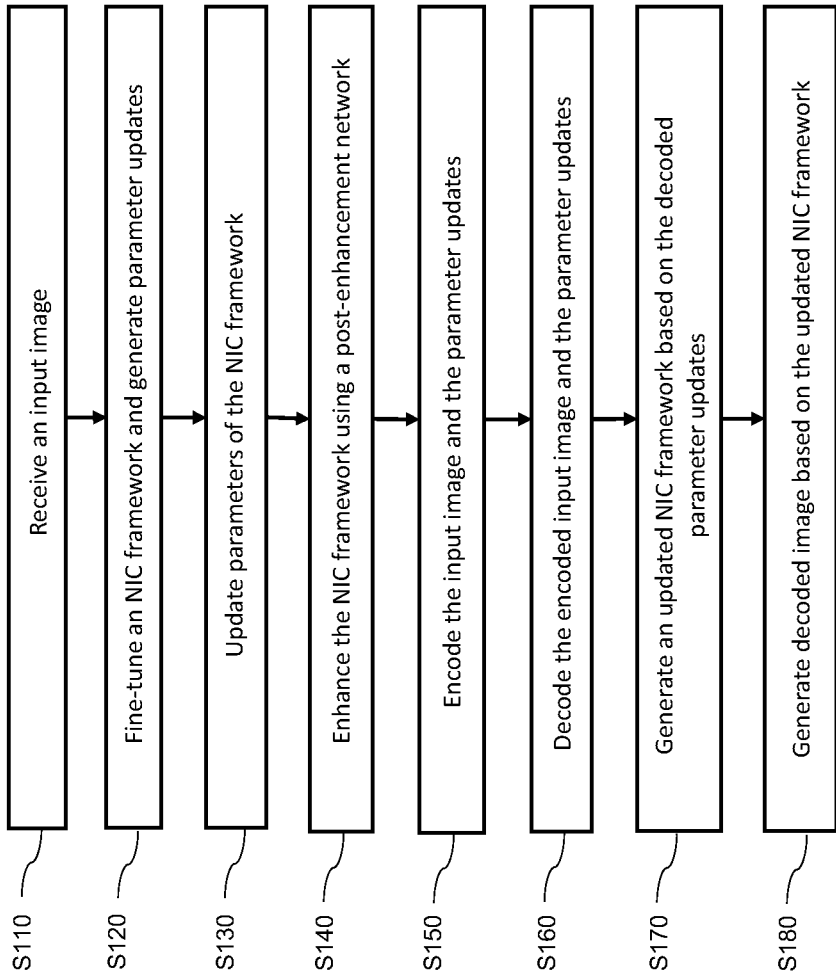

S110 — Receive an input image

S120 — Fine-tune an NIC framework and generate parameter updates

S130 — Update parameters of the NIC framework

S140 — Enhance the NIC framework using a post-enhancement network

S150 — Encode the input image and the parameter updates

S160 — Decode the encoded input image and the parameter updates

S170 — Generate an updated NIC framework based on the decoded parameter updates

S180 — Generate decoded image based on the updated NIC framework

FIG. 1

S510  Encode input (blocks) and updated parameters

S520  Decode the encoded input and updated parameters

S530  Updated parameters compressed?

NO

YES

S540  Decompress input image and updated parameters

S550  Update NIC framework

S560  Image decoding

600

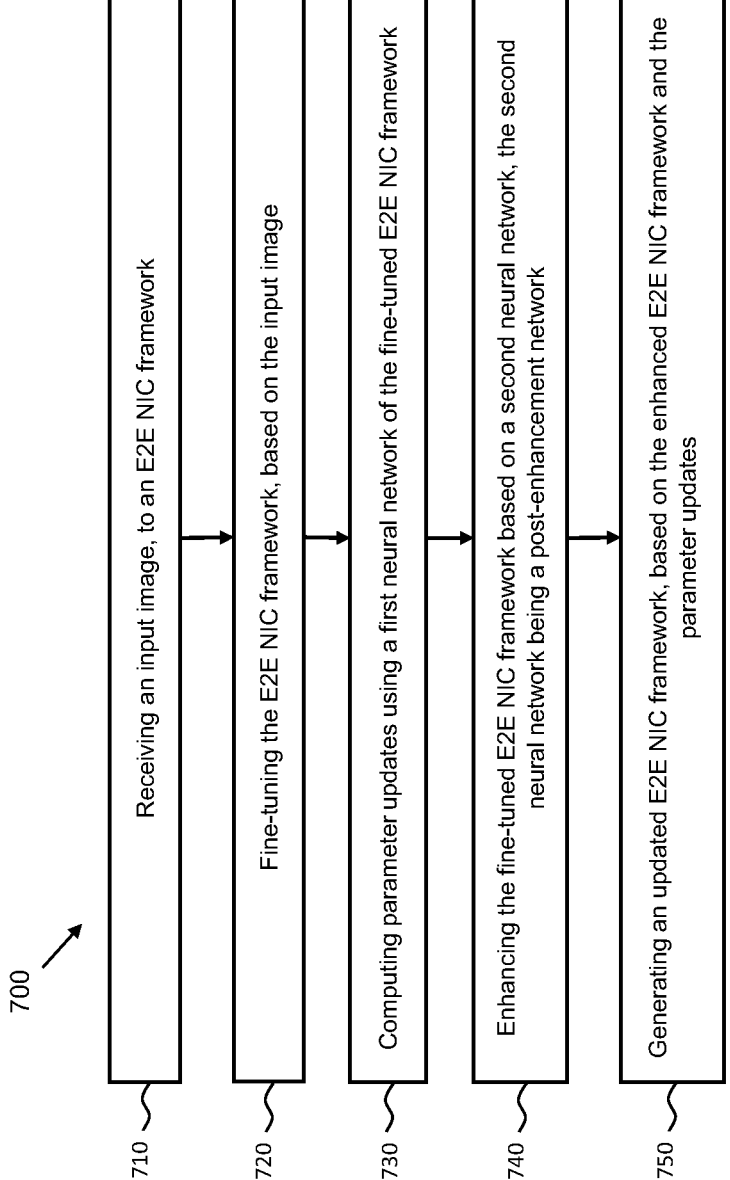

700

710   Receiving an input image, to an E2E NIC framework

720   Fine-tuning the E2E NIC framework, based on the input image

730   Computing parameter updates using a first neural network of the fine-tuned E2E NIC framework 740   Enhancing the fine-tuned E2E NIC framework based on a second neural network, the second neural network being a post-enhancement network 750   Generating an updated E2E NIC framework, based on the enhanced E2E NIC framework and the parameter updates

FIG. 7

SYSTEM, METHOD, AND COMPUTER PROGRAM FOR ITERATIVE CONTENT ADAPTIVE ONLINE TRAINING IN NEURAL IMAGE COMPRESSION

CROSS-REFERENCE TO RELATED APPLICATION

This application is based on and claims priority to U.S. Provisional Patent Application No. 63/289,055, filed on Dec. 13, 2021, the disclosure of which is incorporated by reference herein in its entirety.

BACKGROUND

A traditional hybrid video codec is difficult to be optimized as a whole. An improvement of a single module may not result in a coding gain in overall performance. Recently, Standard groups and companies have been actively searching for potential needs for standardization of future video coding technology. These standard groups and companies have established JPEG-AI group focusing on AI-based end-to-end neural image compression using Deep Neural Networks (DNN). The Chinese audio video coding standards (AVS) have also formed AVS-AI special group to work on neural image and video compression technologies. The success of recent approaches has brought more and more industrial interests in advanced neural image and video compression methodologies.

However, in related art, neural network based video or image coding frameworks are limited to specific types of compression frameworks. In order to accommodate various types of frameworks, conventional systems may require increased computing memory/cost and increased rate-distortion loss, resulting in an overall lower performance of the image or video framework/process.

Therefore, methods of optimizing the coding framework and improving the overall performance are needed.

SUMMARY

According to embodiments, methods are provided for iterative content adaptive online training in neural image compression.

According to an aspect of the disclosure, a method of content-adaptive online training for end-to-end (E2E) neural image compression (NIC) using a neural network performed by at least one processor, is provided. The method includes receiving an input image, to an E2E NIC framework; fine-tuning the E2E NIC framework, based on the input image; computing parameter updates using a first neural network of the fine-tuned E2E NIC framework; enhancing the fine-tuned E2E NIC framework based on a second neural network, the second neural network being a post-enhancement network; and generating an updated E2E NIC framework, based on the enhanced E2E NIC framework and the parameter updates.

The method may further include encoding the input image and the parameter updates to generate a compressed representation of the input image and the parameter updates; decoding the compressed representation of the parameter updates to generate decoded parameter updates; updating the E2E NIC framework based on the decoded parameter updates; and decoding the compressed representation of the input image based on the updated E2E NIC framework to generate a reconstructed image.

The method may further include determining a distortion loss of the reconstructed image based on a consumption of the compressed representation of the input image and the parameter updates, trade-off hyperparameter, and a distortion of decoded block residuals of the reconstructed image.

The method may further include splitting the input image into one or more blocks.

In some embodiments, the parameter updates include a learning rate and a number of steps, and the learning rate and the number of steps are selected based on characteristics of the input image. Further, the characteristics of the input image are one of a RGB variance of the input image and an RD performance of the input image.

In some embodiments, the post-enhancement network is a set of convolutional neural networks or a layer of convolutional neural networks.

In some embodiments, one or more post-enhancements networks are used to enhance the fine-tuned E2E NIC framework.

According to another aspect of the disclosure, an apparatus for content E2E NIC using a neural network, including at least one memory configured to store computer program code and at least one processor configured to read the computer program code and operate as instructed by the computer program code, is provided. The computer program code including receiving code configured to cause the at least one processor to receive an input image, to an E2E NIC framework; fine-tuning code configured to cause the at least one processor to fine-tune the E2E NIC framework, based on the input image; computing code configured to cause the at least one processor to compute parameter updates using a first neural network of the fine-tuned E2E NIC framework; enhancing code configured to cause the at least one processor to enhance the fine-tuned E2E NIC framework based on a second neural network, the second neural network being a post-enhancement network; and generating code configured to cause the at least one processor to generate an updated E2E NIC framework, based on the enhanced E2E NIC framework and the parameter updates.

The apparatus may further include code configured to cause the at least one processor to encode the input image and the parameter updates to generate a compressed representation of the input image and the parameter updates; decode the compressed representation of the parameter updates to generate decoded parameter updates; update the E2E NIC framework based on the decoded parameter updates; and decode the compressed representation of the input image based on the updated E2E NIC framework to generate a reconstructed image.

The apparatus may further include code configured to cause the at least one processor to determine a distortion loss of the reconstructed image based on a consumption of the compressed representation of the input image and the parameter updates, trade-off hyperparameter, and a distortion of decoded block residuals of the reconstructed image.

The apparatus may further include code configured to cause the at least one processor to split the input image into one or more blocks.

According to another aspect of the disclosure, a non-transitory computer-readable medium storing instructions that are executed by at least one processor, of an apparatus for content-adaptive online training for E2E NIC using a neural network, is provided. The instructions cause the at least one processor to receive an input image, to an E2E NIC framework; fine-tune the E2E NIC framework, based on the input image; compute parameter updates using a first neural network of the fine-tuned E2E NIC framework; enhance the fine-tuned E2E NIC framework based on a second neural network, the second neural network being a post-enhancement network; and generate an updated E2E NIC framework, based on the enhanced E2E NIC framework and the parameter updates.

The non-transitory computer-readable medium may further include instructions that further cause the at least one processor to split the input image into the one or more blocks, and compress the one or more blocks individually.

The non-transitory computer-readable medium may further include instructions that further cause the at least one processor to encode the input image and the parameter updates to generate a compressed representation of the input image and the parameter updates; decode the compressed representation of the parameter updates to generate decoded parameter updates; update the E2E NIC framework based on the decoded parameter updates; and decode the compressed representation of the input image based on the updated E2E NIC framework to generate a reconstructed image.

The non-transitory computer-readable medium may further include instructions that further cause the at least one processor to determine a distortion loss of the reconstructed image based on a consumption of the compressed representation of the input image and the parameter updates, trade-off hyperparameter, and a distortion of decoded block residuals of the reconstructed image.

Additional embodiments will be set forth in the description that follows and, in part, will be apparent from the description, and/or may be realized by practice of the presented embodiments of the disclosure.

BRIEF DESCRIPTION OF THE DRAWINGS

FIG. 1 is a flowchart of a general overview of an iterative content-adaptive online training process for an end-to-end (E2E) neural image compression (NIC), according to embodiments.

FIG. 7 is a flowchart illustrating a method iterative content-adaptive online training for end-to-end (E2E) neural image compression (NIC) using a neural network, according to embodiments.

DETAILED DESCRIPTION

Figure 2:
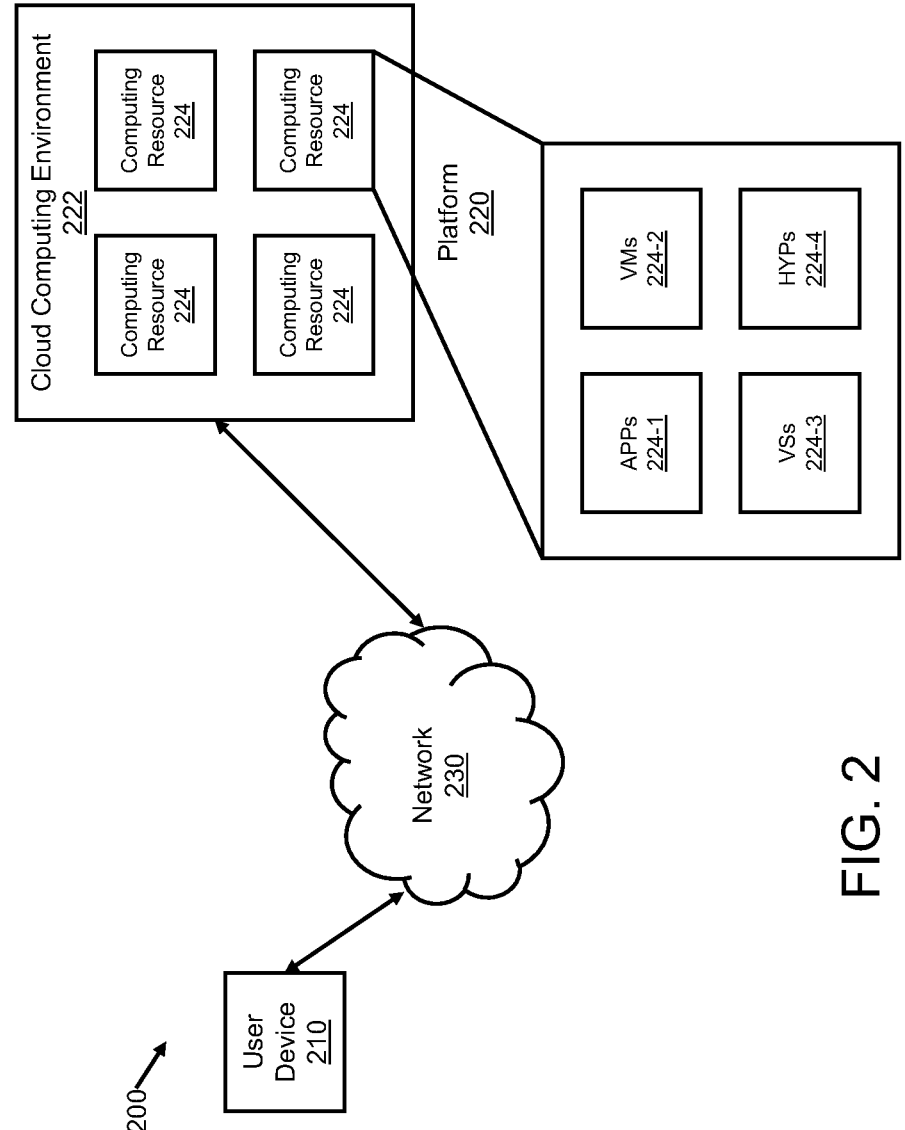
FIG. 2 is a diagram of an environment in which methods, apparatuses and systems described herein may be implemented, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and an apparatus for block-wise content-adaptive online training with post filtering for end-to-end (E2E) neural image compression (NIC) optimized networks. The E2E optimized networks may be, e.g., an artificial neural network (ANN) based image coding framework. In ANN-based video coding frameworks, by performing a machine learning process, different modules may be jointly optimized from input to output to improve a final objective (e.g., rate-distortion performance), resulting in E2E optimized NIC.

FIG. 1 is a flowchart of a general overview of an iterative content-adaptive online training process for E2E NIC of a content-adaptive online training NIC framework, a content-adaptive online training system, or the like, according to embodiments.

First, an input image (or video sequence) is received (S110). The input image may be split, e.g., into blocks. Block-wise image coding may be performed to compress the blocks. At S120, the online training process fine-tunes an NIC framework and generates parameter updates. The NIC framework may be a pretrained framework. At S130, parameters of the NIC framework parameters are updated based on the generated parameter updates. The parameter updates may include, but are not limited to, for example, a step size (i.e., learning rate) and a number of steps. At S140, the NIC framework may further be enhanced using a post-enhancement network. The post-enhancement network is used to enhance the visual quality of the image. Then the input image and the generated parameter updates are encoded by, e.g., a DNN encoder (S150) and then decoded by, e.g., a DNN decoder (S160). The decoded parameter updates are used to update the NIC framework and generate an updated NIC framework (S170). Finally, a decoder of the updated NIC framework is used to decode and generate a final image. That is, at S180, a decoded image is generated based on the updated NIC framework.

FIG. 2 is a diagram of an environment 200 in which methods, apparatuses and systems described herein may be implemented, according to embodiments.

As shown in FIG. 2, the environment 200 may include a user device 210, a platform 220, and a network 230. Devices of the environment 200 may interconnect via wired connections, wireless connections, or a combination of wired and wireless connections.

The user device 210 includes one or more devices capable of receiving, generating, storing, processing, and/or providing information associated with platform 220. For example, the user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 210 may receive information from and/or transmit information to the platform 220.

The platform 220 includes one or more devices as described elsewhere herein. In some implementations, the platform 220 may include a cloud server or a group of cloud servers. In some implementations, the platform 220 may be designed to be modular such that software components may be swapped in or out. As such, the platform 220 may be easily and/or quickly reconfigured for different uses.

In some implementations, as shown, the platform 220 may be hosted in a cloud computing environment 222. Notably, while implementations described herein describe the platform 220 as being hosted in the cloud computing environment 222, in some implementations, the platform 220 may not be cloud-based (i.e., may be implemented outside of a cloud computing environment) or may be partially cloud-based.

The cloud computing environment 222 includes an environment that hosts the platform 220. The cloud computing environment 222 may provide computation, software, data access, storage, etc. services that do not require end-user (e.g., the user device 210) knowledge of a physical location and configuration of system(s) and/or device(s) that hosts the platform 220. As shown, the cloud computing environment 222 may include a group of computing resources 224 (referred to collectively as "computing resources 224" and individually as "computing resource 224").

The computing resource 224 includes one or more personal computers, workstation computers, server devices, or other types of computation and/or communication devices. In some implementations, the computing resource 224 may host the platform 220. The cloud resources may include compute instances executing in the computing resource 224, storage devices provided in the computing resource 224, data transfer devices provided by the computing resource 224, etc. In some implementations, the computing resource 224 may communicate with other computing resources 224 via wired connections, wireless connections, or a combination of wired and wireless connections.

As further shown in FIG. 2, the computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

The application 224-1 includes one or more software applications that may be provided to or accessed by the user device 210 and/or the platform 220. The application 224-1 may eliminate a need to install and execute the software applications on the user device 210. For example, the application 224-1 may include software associated with the platform 220 and/or any other software capable of being provided via the cloud computing environment 222. In some implementations, one application 224-1 may send/receive information to/from one or more other applications 224-1, via the virtual machine 224-2.

The virtual machine 224-2 includes a software implementation of a machine (e.g., a computer) that executes programs like a physical machine. The virtual machine 224-2 may be either a system virtual machine or a process virtual machine, depending upon use and degree of correspondence to any real machine by the virtual machine 224-2. A system virtual machine may provide a complete system platform that supports execution of a complete operating system ("OS"). A process virtual machine may execute a single program, and may support a single process. In some implementations, the virtual machine 224-2 may execute on behalf of a user (e.g., the user device 210), and may manage infrastructure of the cloud computing environment 222, such as data management, synchronization, or long-duration data transfers.

The virtualized storage 224-3 includes one or more storage systems and/or one or more devices that use virtualization techniques within the storage systems or devices of the computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 224-4 may provide hardware virtualization techniques that allow multiple operating systems (e.g., "guest operating systems") to execute concurrently on a host computer, such as the computing resource 224. The hypervisor 224-4 may present a virtual operating platform to the guest operating systems, and may manage the execution of the guest operating systems. Multiple instances of a variety of operating systems may share virtualized hardware resources.

The network 230 includes one or more wired and/or wireless networks. For example, the network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
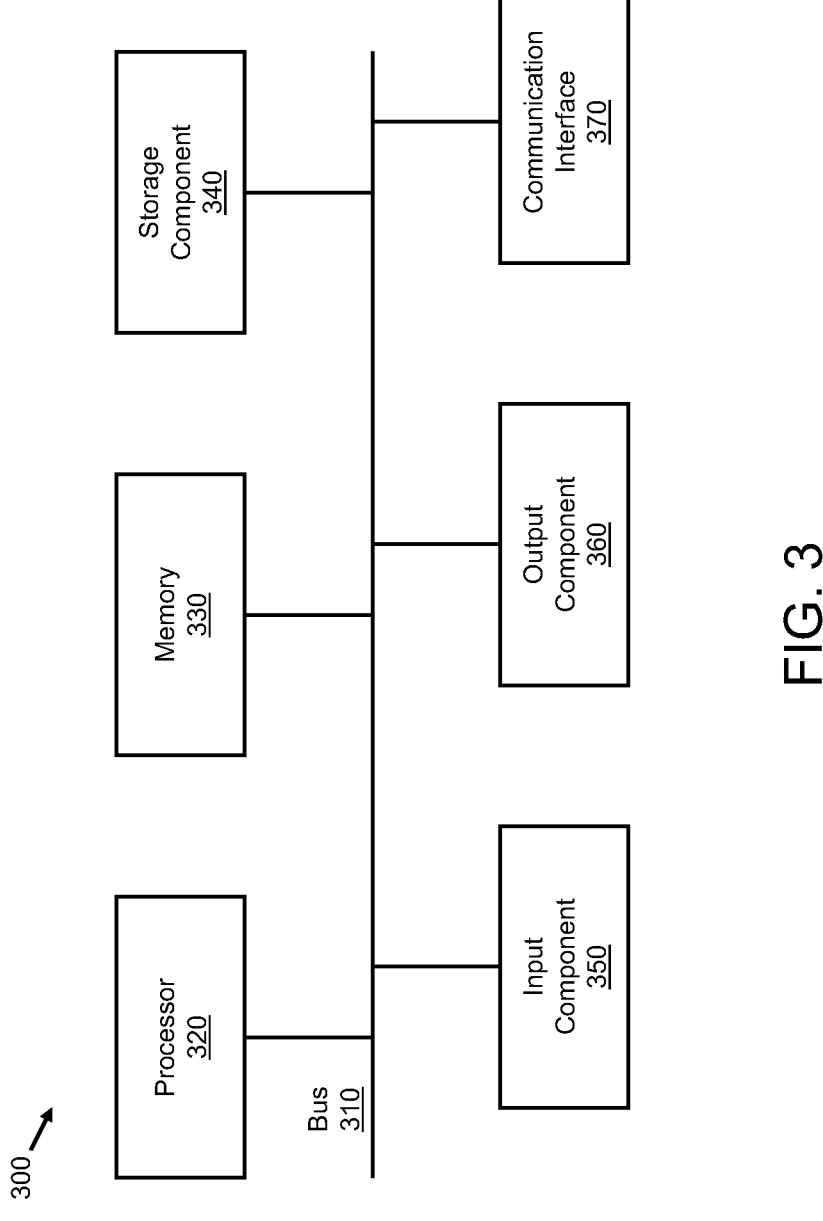
FIG. 3 is a block diagram of example components of one or more devices of FIG. 2.

FIG. 3 is a block diagram of example components of one or more devices of FIG. 2.

A device 300 may correspond to the user device 210 and/or the platform 220. As shown in FIG. 3, the device 300 may include a bus 310, a processor 320, a memory 330, a storage component 340, an input component 350, an output component 360, and a communication interface 370.

The bus 310 includes a component that permits communication among the components of the device 300. The processor 320 is implemented in hardware, software, or a combination of hardware and software. The processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 320 includes one or more processors capable of being programmed to perform a function. The memory 330 includes a random access memory (RAM), a read only memory (ROM), and/or another type of dynamic or static storage device (e.g., a flash memory, a magnetic memory, and/or an optical memory) that stores information and/or instructions for use by the processor 320.

The storage component 340 stores information and/or software related to the operation and use of the device 300. For example, the storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 350 includes a component that permits the device 300 to receive information, such as via user input (e.g., a touch screen display, a keyboard, a keypad, a mouse, a button, a switch, and/or a microphone). Additionally, or alternatively, the input component 350 may include a sensor for sensing information (e.g., a global positioning system (GPS) component, an accelerometer, a gyroscope, and/or an actuator). The output component 360 includes a component that provides output information from the device 300 (e.g., a display, a speaker, and/or one or more light-emitting diodes (LEDs)).

The communication interface 370 includes a transceiver-like component (e.g., a transceiver and/or a separate receiver and transmitter) that enables the device 300 to communicate with other devices, such as via a wired connection, a wireless connection, or a combination of wired and wireless connections. The communication interface 370 may permit the device 300 to receive information from another device and/or provide information to another device. For example, the communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

The device 300 may perform one or more processes described herein. The device 300 may perform these processes in response to the processor 320 executing software instructions stored by a non-transitory computer-readable medium, such as the memory 330 and/or the storage component 340. A computer-readable medium is defined herein as a non-transitory memory device. A memory device includes memory space within a single physical storage device or memory space spread across multiple physical storage devices.

Software instructions may be read into the memory 330 and/or the storage component 340 from another computer-readable medium or from another device via the communication interface 370. When executed, software instructions stored in the memory 330 and/or the storage component 340 may cause the processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, the device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

In embodiments, any one of the operations or processes of FIGS. 4-9 may be implemented by or using any one of the elements illustrated in FIGS. 2 and 3.

According to some embodiments, a general process for neural network based image compression may be as follows. Given an image or video sequence x, the target of NIC is to use the image x as the input to an DNN encoder to compute a compressed representation $\hat{x}$ that is compact for storage and transmission purposes. Subsequently, the compressed representation $\hat{x}$ is used as the input to a DNN decoder to reconstruct an image $\bar{x}$. Some NIC methods may take a variational autoencoder (VAE) structure, where the DNN encoders directly use the entire image x as its input, which is passed through a set of network layers that work like a black box to compute the output representation (i.e. the compressed representation $\hat{x}$). Correspondingly, the DNN decoder takes the entire compressed representation $\hat{x}$ as its input, which is passed through another set of network layers that work like another black box to compute the reconstructed image $\bar{x}$. A Rate-Distortion (R-D) loss is optimized to achieve trade-off between the distortion loss $D(x,\bar{x})$ of the reconstructed image $\bar{x}$ and the bit consumption R of the compressed representation x̂ with a trade-off hyperparameter λ using the following target loss function L:

$$L(x,\bar{x},\hat{x})=\lambda D(x,\bar{x})+R(\hat{x}) \qquad \text{Equation (1)}$$

Embodiments relate to block-wise iterative content-adaptive E2E online training of NIC frameworks. First, the input image x is split by optimizing a rate-distortion performance on input blocks. During the online training, partial (or entire) parameters of a pretrained network may be updated. The pretrained network may be neural network based. The updated partial (or entire) parameters are encoded into bitstreams, along with the encoded input image (i.e., compressed representation x̂). By using these parameter updates (fine-tuned by one or multiple images), the DNN decoder may decode the encoded block and achieve better compression performance. This fine-tuning process is used as a preprocessing step in the iterative content-adaptive online training NIC framework for boosting the compression performance of any pretrained E2E NIC compression method. In some embodiments, the method may also be used on E2E NIC frameworks trained by the iterative content-adaptive online training NIC framework itself.

A detailed description of the preprocessing of the iterative content-adaptive online training NIC framework, according to one or more embodiments, will now be described.

As mentioned, the pretrained NIC framework is fine-tuned based on the input image(s). The fine-tuned NIC framework is then used to obtain parameter updates by which the NIC framework is updated. In this manner, the NIC framework may adapt to the target image content. When fine-tuning NIC framework, one or more of the network parameters may be updated.

In some embodiments, the parameters may be entirely or partially updated. For example, the parameters may be updated only on one module of the NIC framework (such as a context model or a hyper decoder). As another example, the parameters may be updated on multiple or all modules of the NIC framework.

In some embodiments, only the bias terms are optimized and updated. In another example embodiment, the coefficient (weight) terms are optimized. Alternatively, e.g., all the parameters may be optimized.

In some embodiments, the NIC framework is fine-tuned and the updated NIC framework is generated based on a single input image. In some embodiments, the NIC framework is fine-tuned and the fine-tuned NIC framework is used to generate the updated framework based on a set of input images.

The fine-tuning process contains multiple epochs where the parameters are updated in this iterative online training process. Fine-tuning is stopped when the training loss (e.g., determined based on the target loss function in Equation 1) has flattened or is about to flatten. There are two key hyperparameters in the iterative content-adaptive online training NIC framework: step size and number of steps. Step size indicates the 'learning rate' of the online training NIC framework. Images with different types of content may correspond to different step sizes to achieve the best optimization results. Number of steps indicates the number of updates operated. Together with the target loss function (Equation 1), the hyperparameters are used for the online learning process. For example, the step size can be used in a gradient descent algorithm or a backpropagation calculation performed in the learning process. The number of iterations can be used as a threshold of a maximum number of iterations to control when the learning process may be terminated. In some embodiments, during the iterative online training process, the learning rate (i.e., step size) may be altered in each step by a scheduler. The scheduler will decide the learning rate value, which can be increasing, decreasing, or kept the same for several intervals. There may be a single scheduler or multiple (different) schedulers for different input images. Multiple parameter updates may be generated based on multiple learning rate schedulers, and the scheduler with the better compression performance for each of the parameter updates may be chosen. At the end of the fine-tuning process, parameter updates are computed. In some embodiments, the parameter updates are then compressed at the end of the fine-tuning process. For example, a compression algorithm (such as LZMA2) may be used to compress the parameter updates. In another example embodiment, the compression of the parameter updates is not performed.

In some embodiments, the parameter updates are calculated as the difference between fine-tuned parameters and pretrained parameters. In some embodiments, the parameter updates are the fine-tuned parameters. In another example embodiment, the parameter updates are some transforms of the fine-tuned parameters.

Figure 4:
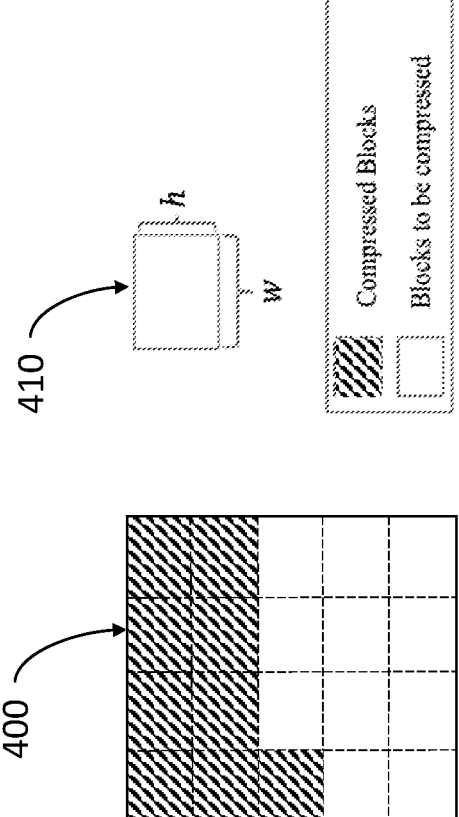
FIG. 4 illustrates an example of block-wise image coding.

FIG. 4 illustrates an example of block-wise image coding. For the iterative content-adaptive online training NIC framework according to embodiments, instead of directly encoding an entire input image, a block-based coding mechanism may be used to compress the image frames. Using the block-based coding mechanism, the entire input image is first partitioned into blocks of the same (or various) sizes, and the blocks are compressed individually.

As shown in FIG. 4, an image 400 may first be split into blocks (illustrated by the dashed line in FIG. 4) and the spilt blocks may be compressed instead of the image 400 itself. The compressed blocks are shaded in FIG. 4 and the blocks to be compressed are not shaded. The split blocks may be equally sized or non-equally sized. The step size for each block may be different. To this end, different step sizes may be assigned for an image 400 in order to achieve better compression results. Block 410 is an example of one of the split blocks with a height h and width w. The blocks are passed through a block-wise image encoding process to generate a bitstream of encoded information.

In some embodiments, an image may be compressed without splitting to blocks and the entire image may be the input of the E2E NIC model. Different images may have different step sizes to achieve optimized compression result.

The step size (i.e., the learning rate of the content-adaptive online training NIC framework) may be chosen based on the characteristics of the image (or a block). For example, a characteristic of an image may be based on an red-green-blue (RGB) color model and the RGB variance of the image. Further, in some embodiments, the step size may be chosen based on an RD performance of the image (or the block). Therefore, according to embodiments thereof, multiple parameter updates may be generated based on different step sizes, and the step size with the better compression performance for each of the parameter updates may be chosen.

Multiple learning rate schedulers may be assigned for different blocks in order to achieve better compression results. In some embodiments, all blocks share the same learning rate schedules. Learning rate scheduler selection may also be based on the characteristics of a block, such as the RGB variance of the block or the RD performance of the block.

Different blocks may update different parameters in different modules (for example, in context module or hyper decoder) or different types of parameters (bias or weights) of the iterative content-adaptive online training NIC framework according to embodiments. In some embodiments, all the blocks share the same parameter updates. The parameters (to be updated) may be chosen based on the characteristics of a block, such as the RGB variance of the block or the RD performance of the block.

Different blocks may choose different ways to transform the parameter updates. For example, in some embodiments, one block may choose to update parameters of the NIC framework based on the difference between fine-tuned parameters and pretrained parameters. Another block may choose to update the parameters directly. In some embodiments, all the blocks parameter updates in the same way. The ways to transform the parameter updates may be chosen based on the characteristics of a block, such as the RGB variance of the block or the RD performance of the block.

Different blocks may choose different ways to compress the parameter updates. For example, one block may use the LZMA2 algorithm to compress the parameter updates. Another block may use the bzip2 algorithm to compress the parameter updates. Embodiments are not limited to this and may use any compression algorithm suitable for compressing the parameters. In some embodiments, all blocks use the same method to compress (or not compress) the parameter updates. The compression method may be chosen based on the characteristics of a block, such as the RGB variance of the block or the RD performance of the block.

Each of the compressed images or blocks may use a post-enhancement network to enhance visual quality. The enhancement process may be the same as the process implemented to updating the NIC framework parameter(s). In some embodiments, the post-enhancement network includes a set of convolutional neural networks. In some embodiments, the post-enhancement network is only made up of one convolutional neural network layer. The post-enhancement network may be pretrained by a training dataset. In another embodiment, the post-enhancement network is not pretrained.

In some embodiments, each image/block to be compressed uses one post-enhancement network to improve the visual quality. In another embodiment, each image/block to be compressed uses use multiple post-enhancement networks to improve the visual quality iteratively. That is, the image/block is enhanced one after another until no gain is obtained.

A coding process of the iterative content-adaptive online training NIC framework applied to images/blocks to generate a reconstructed image is described with reference to FIG. 5.

Figure 5:
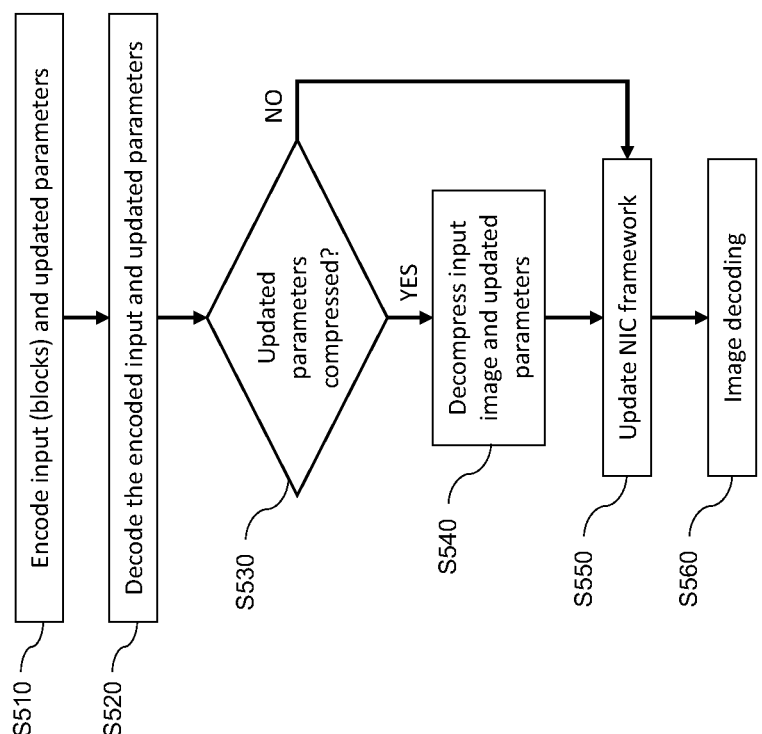
FIG. 5 is a flowchart example of the coding process according to embodiments.

FIG. 5 is a flowchart example of the coding process according to embodiments.

First, at S510, the NIC framework encodes the input image and the parameter updates. Subsequently, the encoded input and the encoded parameter updates are decoded (S520). If the parameter updates were compressed (YES at S530), the parameter updates obtained from the online training process are first decompressed (S540). If the parameter updates were not compressed (NO at S530), the process proceeds to S550. At S550, the NIC framework is updated at the decoder side using the decoded parameter updates from S520 or the decompressed decoded parameter updates from S540. Finally, at S560, the updated NIC framework decoder is used to for image decoding (to generate the reconstructed image x). Based on how the parameters transformed, the updated parameter values update the original (pretrained) bias terms.

Embodiments do not put any restrictions on the methods used for, e.g., a neural encoder, an encoder, a decoder, and a neural decoder. The iterative content-adaptive online training methods, according to embodiments, may accommodate different types of NIC frameworks. For example, the process may be performed using different types of encoding and decoding DNN.

Figure 6:
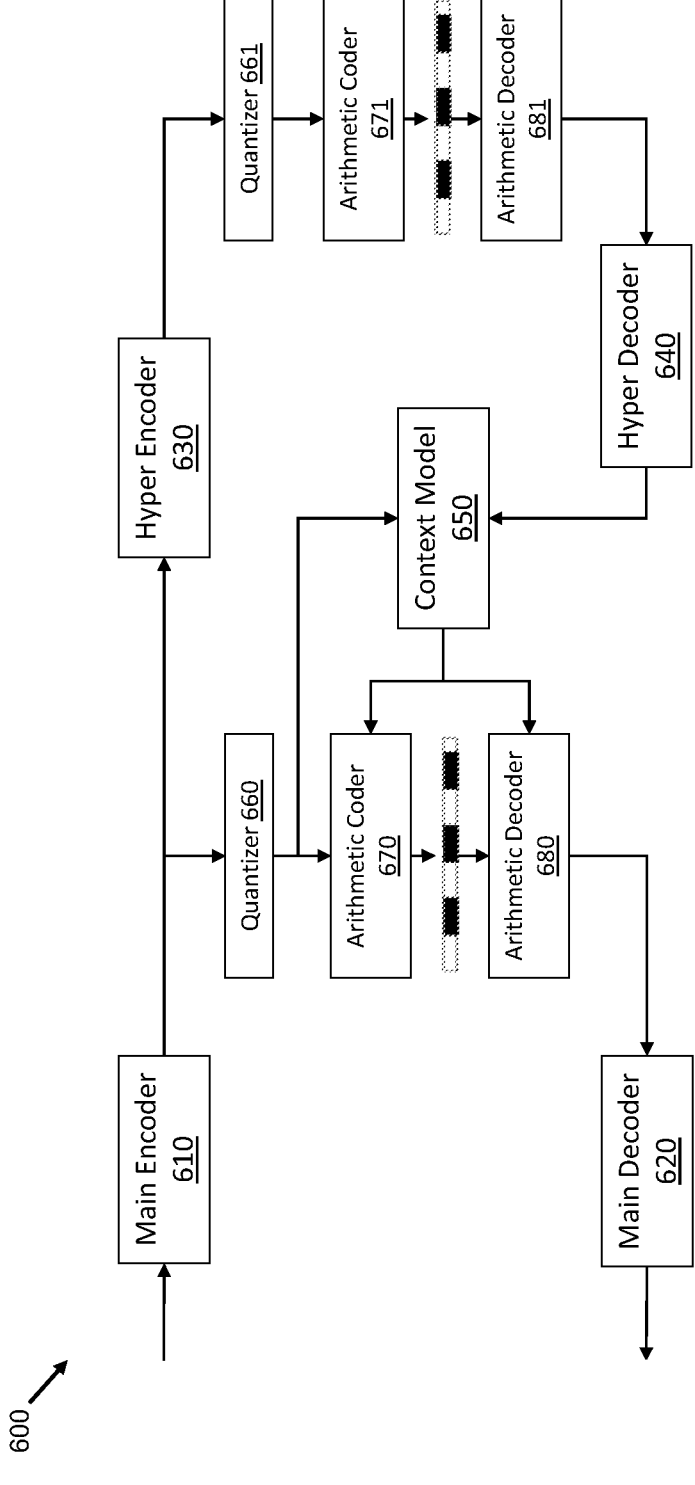
FIG. 6 is an illustration of an exemplary block diagram of an end-to-end (E2E) neural image compression (NIC) framework using iterative content-adaptive online training, according to embodiments.

FIG. 6 is an illustration of an exemplary block diagram 600 of the E2E NIC framework using iterative content-adaptive online training, according to embodiments.

As shown in FIG. 6, the E2E NIC framework includes a main encoder 610, main decoder 620, hyper encoder 630, hyper decoder 640, and a context model 650. The E2E NIC framework may include one or multiple such modules. The E2E NIC framework further includes a quantizer 660/661, an arithmetic coder 670/671, and an arithmetic decoder 680/681. The same or similar modules are represented by the same reference numbers. The E2E NIC framework may include one or more modules not shown in FIG. 6.

The E2E NIC framework may use any DNN-based image compression method, such as scale-hyperprior encoder-decoder framework (or Gaussian Mixture Likelihoods framework) and its variants, RNN-based recursive compression method and its variants.

According to embodiments of the present disclosure, an E2E NIC framework may utilize the block diagram 600 as follows. Given an input image or video sequence x, the main encoder 610 may compute a compressed representation $\hat{x}$ that is compact for storage and transmission purposes when compared to the input image x. The compressed representation $\hat{x}$ may be quantized into a discrete-valued quantized representation $\check{x}$ using quantizer 660. This discrete-valued quantized representation $\check{x}$ may then be entropy encoded into a bitstream using the arithmetic coder 670 using arithmetic coding (lossless or lossy). On the decoder side, the bitstream may go through lossless or lossy entropy decoding using arithmetic decoder 680 to recover discrete-valued quantized representation $\check{x}$. This discrete-valued quantized representation $\check{x}$ may then be input into the main decoder 620 to recover and/or reconstruct the input image or video sequence $\bar{x}$. The main encoder 610 and main decoder 620 may be a neural network based encoders and decoders (e.g., DNN based coder).

According to some embodiments, the E2E NIC framework may, during the online training phase, includes hyper prior and context models to further improve the compression performance. A hyper prior model may be used to capture spatial dependencies in latent representations generated between layers in the neural network. According to some embodiments, side information may be used by a hyper prior model, side information being commonly generated by motion-compensated temporal interpolation of the neighboring reference frames at the decoder side. This side information may be used for training and inferring the E2E NIC framework. The hyper encoder 630 may encode the compressed representation $\hat{x}$ using a hyperprior neural network based encoder. Then, a hyper compressed representation of the hyper-encoded compressed representation may be generated using the quantizer 661 and the arithmetic coder 671. The arithmetic decoder 681 may decode the hyper compressed representation. Then a hyper reconstructed image x' may be generated using a hyper prior neural network based hyper decoder 640. The neural network based context model 650 may be trained using the hyper reconstructed image and the quantized representation from quantizer 660. The arithmetic coder 670 and arithmetic decoder 680 may use the context model 650 for encoding and decoding, respectively.

According to embodiments, the E2E NIC framework is self-trained. The target of the training process is to learn DNN encoding and DNN decoding (i.e., main encoder 610 and main decoder 620). In the training process, the weight coefficients of the DNNs (i.e., main encoder 610 and main decoder 620) are first initialized by, for example, using pre-trained corresponding DNN models, or by setting them to random numbers. Then, given an input training image x, input training image x is passed through the encoding process described in FIG. 4 to generate the encoded information into a bitstream, which will then be passed through the decoding process described in FIG. 6 to compute and reconstruct the image $\bar{x}$. For the E2E NIC framework (as shown in FIG. 6), two competing targets are dealt with: better reconstruction quality versus less bit consumption. A quality loss function $D(x,\bar{x})$ may be used to measure the reconstruction quality (also called the distortion loss), such as the traditional peak signal-to-noise ratio (PSNR), multi-scale structural similarity index measure (MS-SSIM), or a weighted combination of both. A rate loss $$R\left(\sum_{1}^{n} s_i, \sum_{1}^{n} u_i\right)$$

is computed to measure the bit consumption of the compressed representations. Therefore, a trade-off hyperparameter $\lambda$ is used to optimize a joint Rate-Distortion (R-D) loss according to the following equation:

$$L(x, \bar{x}, \hat{r}_1, \ldots, \hat{r}_N, \hat{y}) = \lambda D(x, \bar{x}) + R\left(\sum_{1}^{n} s_i, \sum_{1}^{n} u_i\right) + \beta E \quad \text{Equation (2)}$$

Where E measures the distortion of the decoded block residuals compared with the original block residuals before encoding, which acts as regularization loss for the Residual Encoding/Decoding DNNs and the Encoding/Decoding DNNs. $\beta$ is a hyperparameter to balance the importance of the regularization loss.

In some embodiments, the encoding DNN and the decoding DNN may be updated together based on back-propagated gradients in an E2E framework.

FIG. 7 is a flowchart illustrating a method 700 for iterative content-adaptive online training of E2E NIC using a neural network, according to embodiments.

In some implementations, one or more process blocks of FIG. 7 may be performed by the platform 220. In some implementations, one or more process blocks of FIG. 7 may be performed by another device or a group of devices separate from or including the platform 220, such as the user device 210.

As shown in FIG. 7, at operation 710 the method may include receiving an input image, to an E2E NIC framework. In some embodiments, the method includes splitting the input image into one or more blocks.

At operation 720, the method 700 may include fine-tuning the E2E NIC framework, based on the input image.

At operation 730, the method 700 may include computing parameter updates using a first neural network of the fine-tuned E2E NIC framework. The parameter updates may include a learning rate and a number of steps, and wherein the learning rate and the number of steps are selected based on characteristics of the input image. The characteristics of the input image may be one of a RGB variance of the input image and an RD performance of the input image.

At operation 740, the method 700 may include enhancing the fine-tuned E2E NIC framework based on a second neural network, the second neural network being a post-enhancement network. The post-enhancement network may be a set of convolutional neural networks or a layer of convolutional neural networks. Further, one or more post-enhancements networks may be used to enhance the fine-tuned E2E NIC framework.

At operation 750, the method 700 may include generating an updated E2E NIC framework, based on the enhanced E2E NIC framework and the parameter updates.

In some embodiments, the method includes encoding the input image and the parameter updates to generate a compressed representation of the input image and the parameter updates, decoding the compressed representation of the parameter updates to generate decoded parameter updates, updating the E2E NIC framework based on the decoded parameter updates, and decoding the compressed representation of the input image based on the updated E2E NIC framework to generate a reconstructed image.

In some embodiments, the method includes determining a distortion loss of the reconstructed image based on a consumption of the compressed representation of the input image and the parameter updates, trade-off hyperparameter, and a distortion of decoded block residuals of the reconstructed image.

Although FIG. 7 shows example blocks of the method, in some implementations, the method may include additional blocks, fewer blocks, different blocks, or differently arranged blocks than those depicted in FIG. 7. Additionally, or alternatively, two or more of the blocks of the method may be performed in parallel.

Figure 8:
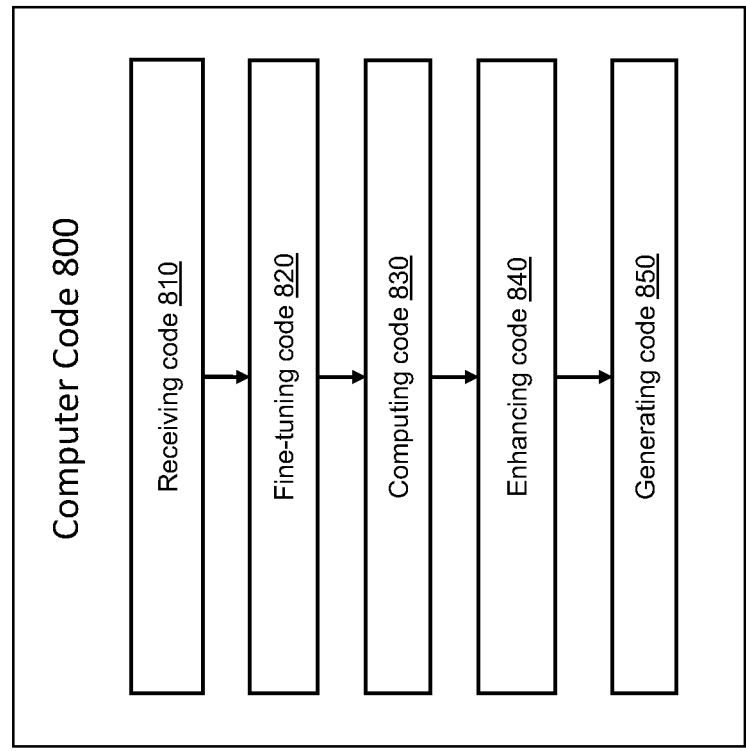
FIG. 8 is a block diagram of an example of computer code for iterative content-adaptive online training for end-to-end (E2E) neural image compression (NIC) using a neural network, according to embodiments.

FIG. 8 is a block diagram of an example of computer code 800 for iterative content-adaptive online training of E2E NIC using a neural network, according to embodiments. According to embodiments of the present disclosure, an apparatus/device including at least one processor with memory storing computer code may be provided. The computer code may be configured to, when executed by the at least one processor, perform any number of aspects of the present disclosure.

As shown in FIG. 8, the computer code 800 includes receiving code 810, fine-tuning code 820, computing code 830, enhancing code 840, and generating code 850.

The receiving code 810 is configured to cause the at least one processor to receive an input image, to an E2E NIC framework. The computer code 800 may further include code configured to cause the at least one processor to split/partition the input image into the one or more blocks.

The fine-tuning code 820 is configured to cause the at least one processor to fine-tuning code configured to cause the at least one processor to fine-tune the E2E NIC framework, based on the input image.

The computing code 830 is configured to cause at least one processor to compute parameter updates using a first neural network of the fine-tuned E2E NIC framework. The parameter updates may include a learning rate and a number of steps, and wherein the learning rate and the number of steps are selected based on characteristics of the input image. The characteristics of the input image may be one of a RGB variance of the input image and an RD performance of the input image.

The enhancing code 840 is configured to cause at least one processor to enhance the fine-tuned E2E NIC framework based on a second neural network, the second neural network being a post-enhancement network. The post-enhancement network may be a set of convolutional neural networks or a layer of convolutional neural networks. Further, one or more post-enhancements networks may be used to enhance the fine-tuned E2E NIC framework.

The generating code 850 is configured to cause at least one processor to generate an updated E2E NIC framework, based on the enhanced E2E NIC framework and the parameter updates.

The computer code 800 may even further include code configured to cause at least one processor to encode the input image and the parameter updates to generate a compressed representation of the input image and the parameter updates, decode the compressed representation of the parameter updates to generate decoded parameter updates, updating the E2E NIC framework based on the decoded parameter updates, and decode the compressed representation of the input image based on the updated E2E NIC framework to generate a reconstructed image.

The computer code 800 may even further include code configured to cause at least one processor to determine a distortion loss of the reconstructed image based on a consumption of the compressed representation of the input image and the parameter updates, trade-off hyperparameter, and a distortion of decoded block residuals of the reconstructed image.

Although FIG. 8 shows example blocks of code, in some implementations, the apparatus/device may include additional blocks, fewer blocks, different blocks, or differently arranged blocks than those depicted in FIG. 8. Additionally, or alternatively, two or more of the blocks of the apparatus may be combined. In other words, while FIG. 8 shows distinct blocks of code, the various code instructions need not be distinct and could be intermingled.

The methods and processes for iterative content-adaptive online training of E2E NIC frameworks described in the present disclosure provide the flexibility to adaptive online training mechanisms to improve the NIC coding efficiency and support different types of learning-based quantization methods, including DNN-based or conventional model-based methods. The described methods also provides a flexible and general framework that accommodates different DNN architectures and a plurality of quality metrics.

The techniques described above, can be implemented as computer software using computer-readable instructions and physically stored in one or more computer-readable media or by a specifically configured one or more hardware processors. For example, FIG. 2 shows an environment 200 suitable for implementing various embodiments. In one example, the one or more processors execute a program that is stored in a non-transitory computer-readable medium.

As used herein, the term component is intended to be broadly construed as hardware, software, or a combination of hardware and software.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of content-adaptive online training for end-to-end (E2E) neural image compression (NIC) using a neural network performed by at least one processor, the method comprising:

receiving an input image, to an E2E NIC framework;

splitting, based on determining a rate-distortion performance on input blocks of the input image, the input image into a plurality of blocks and implementing, for each of the blocks separately, a series of:

fine-tuning the E2E NIC framework, based on the input image and at least two hyperparameters, a first hyperparameter of step size indicating a learning rate of the content-adaptive online training, and a second hyperparameter of a number of steps indicating a number of updates;

computing parameter updates using a first neural network of the fine-tuned E2E NIC framework;

enhancing the fine-tuned E2E NIC framework based on a second neural network, the second neural network being a post-enhancement network; and generating an updated E2E NIC framework, based on the enhanced E2E NIC framework and the parameter updates, and the rate-distortion performance is determined based on a loss as L which is determined according to $$\lambda D(x, \bar{x}) + R\left(\sum\nolimits_1^n s_i, \sum\nolimits_1^n u_i\right) + \beta E,$$

where $\lambda$ and $\beta$ are ones of hyperparameters, $D(x,\bar{x})$ represents a distortion loss of a reconstructed image $$\bar{x}, R\left(\sum\nolimits_1^n s_i, \sum\nolimits_1^n u_i\right)$$

represents a rate loss with respect to bit consumption of a compressed representation $\hat{x}$ of a video sequence x having the input image, and E represents a distortion of decoded block residuals compared with original block residuals before encoding.

2. The method according to claim 1, further comprising:

encoding the input image and the parameter updates to generate a compressed representation of the input image and the parameter updates;

decoding the compressed representation of the parameter updates to generate decoded parameter updates;

updating the E2E NIC framework based on the decoded parameter updates; and

17

18 decoding the compressed representation of the input image based on the updated E2E NIC framework to generate a reconstructed image.

3. The method according to claim 2, further comprising determining a distortion loss of the reconstructed image based on a consumption of the compressed representation of the input image and the parameter updates, trade-off hyper-parameter, and a distortion of decoded block residuals of the reconstructed image.

4. The method according to claim 1, wherein the parameter updates include a learning rate and a number of steps, and the learning rate and the number of steps are selected based on characteristics of the input image.

5. The method according to claim 4, wherein the characteristics of the input image are one of a RGB variance of the input image and an RD performance of the input image.

6. The method according to claim 1, wherein the post-enhancement network is a set of convolutional neural networks or a layer of convolutional neural networks, and wherein one or more post-enhancements networks are used to enhance the fine-tuned E2E NIC framework.

7. The method according to claim 1, wherein the series further comprises updating pretrained parameters of the E2E NIC framework on a per block, of the plurality of blocks, basis and, per block, obtaining a difference between the pretrained parameters and parameters obtained by fine-tuning the E2E NIC framework.

8. The method according to claim 1, wherein a step-size of the series differs between at least two of the blocks.

9. An apparatus for content-adaptive online training for end-to-end (E2E) neural image compression (NIC) using a neural network, the apparatus comprising:

at least one memory configured to store computer program code; and at least one processor configured to read the computer program code and operate as instructed by the computer program code, the computer program code including:

receiving code configured to cause the at least one processor to receive an input image, to an E2E NIC framework;

splitting code configured to cause the at least one processor to split, based on determining a rate-distortion performance on input blocks of the input image, the input image into a plurality of blocks and implementing, for each of the blocks separately, a series of:

fine-tuning code configured to cause the at least one processor to fine-tune the E2E NIC framework, based on the input image and at least two hyper-parameters, a first hyperparameter of step size indicating a learning rate of the content-adaptive online training, and a second hyperparameter of a number of steps indicating a number of updates;

computing code configured to cause the at least one processor to compute parameter updates using a first neural network of the fine-tuned E2E NIC framework;

enhancing code configured to cause the at least one processor to enhance the fine-tuned E2E NIC framework based on a second neural network, the second neural network being a post-enhancement network; and generating code configured to cause the at least one processor to generate an updated E2E NIC framework, based on the enhanced E2E NIC framework and the parameter updates, and the rate-distortion performance is determined based on a loss as L which is determined according to $$\lambda D(x, \bar{x}) + R\left(\sum_1^n s_i, \sum_1^n u_i\right) + \beta E,$$

where $\Delta$ and $\beta$ are ones of hyperparameters, $D(x, \bar{x})$ represents a distortion loss of a reconstructed image $\bar{x}$, $$R\left(\sum_1^n s_i, \sum_1^n u_i\right)$$

represents a rate loss with respect to bit consumption of a compressed representation $\hat{x}$ of a video sequence x having the input image, and E represents a distortion of decoded block residuals compared with original block residuals before encoding.

10. The apparatus of claim 9, the computer program code further including:

encoding code configured to cause the at least one processor to encode the input image and the parameter updates to generate a compressed representation of the input image and the parameter updates;

first decoding code configured to cause the at least one processor to decode the compressed representation of the parameter updates to generate decoded parameter updates;

updating code configured to cause the at least one processor to update the E2E NIC framework based on the decoded parameter updates; and image generating code configured to cause the at least one processor to decode the compressed representation of the input image based on the updated E2E NIC framework to generate a reconstructed image.

11. The apparatus of claim 10, the computer program code further including determining code configured to cause the at least one processor to determine a distortion loss of the reconstructed image based on a consumption of the compressed representation of the input image and the parameter updates, trade-off hyperparameter, and a distortion of decoded block residuals of the reconstructed image.

12. The apparatus of claim 9, wherein the parameter updates include a learning rate and a number of steps, and the learning rate and the number of steps are selected based on characteristics of the input image.

13. The apparatus of claim 12, wherein the characteristics of the input image are one of a RGB variance of the input image and an RD performance of the input image.

14. The apparatus of claim 9, wherein the post-enhancement network is a set of convolutional neural networks or a layer of convolutional neural networks, and wherein one or more post-enhancements networks are used to enhance the fine-tuned E2E NIC framework.

15. A non-transitory computer-readable medium storing instructions that, when executed by at least one processor of an apparatus for content-adaptive online training for end-to-end (E2E) neural image compression (NIC) using a neural network, cause the at least one processor to:

receive an input image, to an E2E NIC framework;

splitting, based on determining a rate-distortion performance on input blocks of the input image, the input image into a plurality of blocks and implementing, for each of the blocks separately, a series of:

fine-tune the E2E NIC framework, based on the input image and at least two hyperparameters, a first hyperparameter of step size indicating a learning rate of the content-adaptive online training, and a second hyperparameter of a number of steps indicating a number of updates;

compute parameter updates using a first neural network of the fine-tuned E2E NIC framework;

enhance the fine-tuned E2E NIC framework based on a second neural network, the second neural network being a post-enhancement network; and generate an updated E2E NIC framework, based on the enhanced E2E NIC framework and the parameter updates, and the rate-distortion performance is determined based on a loss as L which is determined according to $$\lambda D(x, \bar{x}) + R\left(\sum_1^n s_i, \sum_1^n u_i\right) + \beta E,$$

where $\lambda$ and $\beta$ are ones of hyperparameters, $D(x, \bar{x})$ represents a distortion loss of a reconstructed image $$\bar{x}, R\left(\sum_1^n s_i, \sum_1^n u_i\right)$$

represents a rate loss with respect to bit consumption of a compressed representation $\hat{x}$ of a video sequence x having the input image, and E represents a distortion of decoded block residuals compared with original block residuals before encoding.

16. The non-transitory computer-readable medium of claim 15, wherein the instructions further cause the at least one processor to:

encode the input image and the parameter updates to generate a compressed representation of the input image and the parameter updates;

decode the compressed representation of the parameter updates to generate decoded parameter updates;

update the E2E NIC framework based on the decoded parameter updates; and decode the compressed representation of the input image based on the updated E2E NIC framework to generate a reconstructed image.

17. The non-transitory computer-readable medium of claim 16, wherein the instructions further cause the at least one processor to determine a distortion loss of the reconstructed image based on a consumption of the compressed representation of the input image and the parameter updates, trade-off hyperparameter, and a distortion of decoded block residuals of the reconstructed image.

18. The non-transitory computer-readable medium of claim 15, wherein the parameter updates include a learning rate and a number of steps, and the learning rate and the number of steps are selected based on characteristics of the input image, and the characteristics of the input image are one of a RGB variance of the input image and an RD performance of the input image.

19. The non-transitory computer-readable medium of claim 15, wherein the post-enhancement network is a set of convolutional neural networks or a layer of convolutional neural networks, and wherein one or more post-enhancements networks are used to enhance the fine-tuned E2E NIC framework.

\* \* \* \* \*